United States Patent
Kleihorst et al.

(10) Patent No.: US 6,249,548 B1
(45) Date of Patent: Jun. 19, 2001

(54) MOTION VECTOR PROCESSING

(75) Inventors: Richard Paul Kleihorst; André Van Der Avoird, both of Eindhoven (NL); Luis Alberto Da Silva Cruz, Coimbra (PT)

(73) Assignee: U.S. Phillips Corporation, New York, NY (US)

( * ) Notice: Subject to any disclaimer, the term of this patent is extended or adjusted under 35 U.S.C. 154(b) by 0 days.

(21) Appl. No.: 09/352,505

(22) Filed: Jul. 12, 1999

(30) Foreign Application Priority Data

Jul. 10, 1998 (WO) .................. PCT/US98/014467

(51) Int. Cl.$^7$ .................. H04N 7/12; H04N 7/32
(52) U.S. Cl. .................. 375/240.17; 375/240.16
(58) Field of Search .................. 348/384, 390, 348/400, 401, 402, 409, 415, 416, 417, 418, 699, 700; 375/240; 382/232, 233, 236, 238; H04N 7/12, 7/32

(56) References Cited

U.S. PATENT DOCUMENTS 5,377,266 * 12/1994 Katta .................. 348/416
5,642,166   6/1997 Shin et al. .................. 348/416
5,717,465   2/1998 Kim .................. 348/420
5,731,840 *  3/1998 Kiduchi .................. 348/416

FOREIGN PATENT DOCUMENTS

0294961A2  12/1988 (EP) .................. H04N/7/01
0590663A2   4/1994 (EP) .................. H04N/7/08
0691789A2   1/1996 (EP) .................. H04N/7/26

* cited by examiner

*Primary Examiner*—Howard Britton
*Assistant Examiner*—Nhon T. Diep
(74) *Attorney, Agent, or Firm*—Russell Gross

(57) ABSTRACT

In a motion vector processing method, a motion vector (MV) is generated (MV-EVAL, MV-MEM) for a given picture part (I) based on a selection of a motion vector out of a predetermined set of motion vectors to obtain a selected motion vector, and the given picture part (I) is supplied (EOC) together with a selection indication (SI) of the selected motion vector. In an image signal decoder, motion data are obtained from the selection indication (SI), and an output picture part is generated based on the given picture part (I) and the motion data.

4 Claims, 1 Drawing Sheet

MOTION VECTOR PROCESSING

The invention relates to a motion vector processing to reduce an amount of data required for transmitting or storing motion vectors.

EP 0,691,789 discloses a method and apparatus for motion field estimation, segmentation and coding. The motion estimation technique uses a hierarchical approach in which a motion vector updating routine is performed with respect to multiple levels of smaller and smaller regions of a frame. The motion vector updating routine updates the motion vector of a smaller region by assigning to it a best motion vector selected from among an initial motion vector assigned to the smaller region, motion vectors of neighboring regions, and a matched motion vector obtained by performing a block matching technique for the smaller region. The best motion vector for each region is selected according to a priority scheme and a predetermined threshold value. Adjacent regions having the same motion vector are then merged together, and a region shape representation routine is used to specify contour pixels that will allow the merged regions to be recovered by a decoder. A contour coding routine is then used to encode the contour pixels for transmission to the decoder.

It is, inter alia, an object of the invention to provide an efficient coding scheme which does not need a region merger and contour coding routine. To this end, a first aspect of the invention provides a motion vector processing method and device as defined in claims 1 and 2. A second aspect of the invention provides an image signal decoder and an image signal display apparatus as defined in claims 3 and 4.

In a motion vector processing method in accordance with a primary aspect of the invention, a motion vector is generated for a given picture part based on a selection of a motion vector out of a predetermined set of motion vectors to obtain a selected motion vector, and the given picture part is supplied together with a selection indication of the selected motion vector. In an image signal decoder, motion data are obtained from the selection indication, and an output picture part is generated based on the given picture part and the motion data.

These and other aspects of the invention will be apparent from and elucidated with reference to the embodiments described hereinafter.

IN THE DRAWINGS

Figure 1:
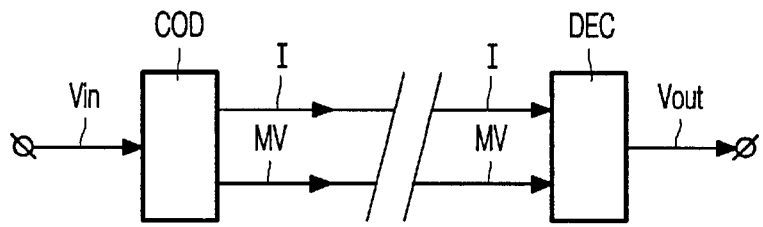
FIG. 1 shows an embodiment of a transmission scheme.

In the transmission scheme of FIG. 1, a video signal Vin is applied to an encoder COD to generate a coded image signal I as well as motion vectors MV. The coded image signal I and the motion vectors MV are received by a decoder DEC to generate an output video signal Vout. Especially in low bit-rate video coding applications with a strongly reduced total number of bits available for the coded image signal I and the motion vectors MV, the bits required for transmission of the motion vectors MV form a significant part of that total number of bits.

It is an object of the invention to reduce the number of bits required for the transmission of motion vector data, so that more bits are available for the coded image signal I so that a better image quality can be achieved, and/or the total number of bits is reduced.

Figure 2:
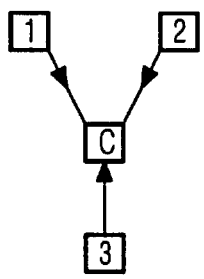
FIG. 2 shows one possible way to generate candidate motion vectors.

The invention is based on the recognition that in a motion vector estimation algorithm in which a motion vector for a given picture part C (e.g. a block of pixels, see FIG. 2) is based on already estimated motion vectors 1, 2 in a present field and/or an already estimated motion vector 3 in a previous field of an image signal, a significant reduction in the number of bits for the motion vector data can be achieved by not transmitting or storing the output motion vectors, but by transmitting or storing an indication of the selected neighboring motion vector. So, if the vector for the neighboring block 2 appears to yield the best result, then just a "2" is transmitted or stored instead of 8 bits for the x-component of the vector and 8 bits for the y-component of the vector: in total 16 bits for each and every motion vector. If there are three or four neighboring vectors from among a choice is made, just transmitting or storing a selection indication only requires 2 bits: a reduction by a factor 8 in this example. This main aspect of the invention presupposes that the decoder DEC knows that it will not receive motion vectors MV but selection indications of neighboring motion vectors. In an in-house or proprietary coding-decoding system, this can easily be achieved. If a decoder is used both for receiving standard digitally encoded picture signals (e.g. H.261, H.263, MPEG) and picture signals with motion vectors encoded in accordance with the present invention, at the start of the transmission a control signal could indicate use of the present invention.

The invention can also be used if cyclically small update vectors are added to all or some of the neighboring motion vectors before they are examined as to their usefulness for the given image part. In that case, still just an indication of the neighboring motion vector is transmitted or stored. This application presupposes that the decoder DEC not only knows that it will receive selection indications rather than full motion vectors, but also how small update vectors are added to the neighboring motion vectors: both the sequence and its start are known. Again, this is no problem in in-house or proprietary coding-decoding systems. Preferably, the invention is applied in equipment which is also capable of encoding/decoding in accordance with an internationally agreed upon standard (e.g. H.261, H.263, MPEG).

Figure 3:
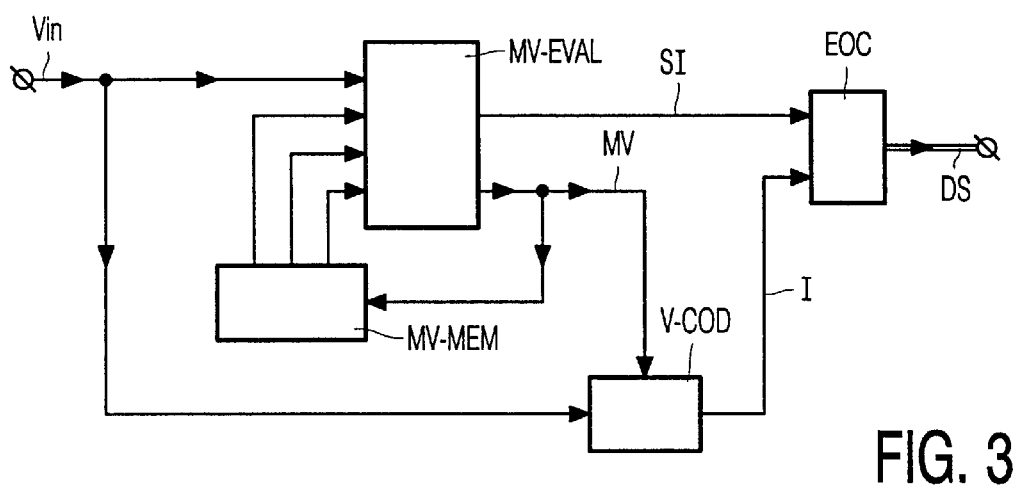
FIG. 3 shows an embodiment of an encoder in accordance with the present invention.

FIG. 3 shows an embodiment of an encoder in accordance with the present invention. The input video signal Vin is applied to a motion vector evaluation circuit MV-EVAL to generate a motion vector MV for the given block C on the basis of a plurality of previously generated motion vectors stored in a motion vector memory MV-MEM. To this end, motion vectors MV obtained by the motion vector evaluation circuit MV-EVAL are applied to the motion vector memory MV-MEM. The motion vector evaluation circuit MV-EVAL further supplies a selection indication signal SI indicating which of the neighboring motion vectors has been selected to an encoder output circuit EOC.

The input video signal Vin is further applied to a video encoder V-COD to obtain a coded image signal I corresponding to the given block C. The encoder output circuit EOC generates a data stream DS from the coded image signal I and the selection indication signal SI.

Figure 4:
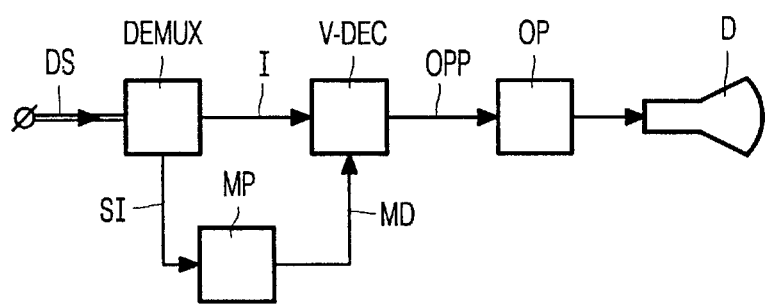
FIG. 4 shows an embodiment of a display apparatus in accordance with the present invention.

FIG. 4 shows an embodiment of a display apparatus in accordance with the present invention. The data stream DS is applied to a demultiplexer DEMUX to obtain the image signal I and the selection indication SI. The selection indication SI is applied to a motion processor MP to obtain motion data MD. The image signal I is applied to a video decoder V-DEC to obtain an output picture part OPP in dependence on the motion data MD. The output picture part OPP is processed by an output processor OP to obtain a display signal which is applied to a display device D.

It should be noted that the above-mentioned embodiments illustrate rather than limit the invention, and that those skilled in the art will be able to design many alternative embodiments without departing from the scope of the appended claims. So, while the invention is particularly suitable for use with the motion estimation and compensation techniques developed in G. de Haan's dissertation Motion Estimation and Compensation, An integrated approach to consumer display field rate conversion, Eindhoven 1992, application of the invention is not limited thereto. For example, while in the above-mentioned embodiment, the predetermined set of motion vectors from which a selection is made comprises motion vectors determined for picture parts spatio-temporally adjacent to the given picture part, it is alternatively possible that in a hierarchical motion estimation method, a selection is made from a predetermined set of motion vectors determined on a lower resolution version of the image. The given picture part may be supplied in a coded form, such as a motion-compensated discrete cosine transform (DCT) encoded form as known from e.g. the MPEG standard. The selection indication may be supplied in a coded form, such as a variable length coded (VLC) form, to achieve a further reduction in the number of bits required for the motion data. In the claims, any reference signs placed between parentheses shall not be construed as limiting the claim. The word "comprising" does not exclude the presence of other elements or steps than those listed in a claim. The word "adjacent" does not necessarily mean "directly adjacent"; as follows from some examples in the above-mentioned dissertation, it is e.g. possible that there is a block present between two "adjacent" blocks. The invention can be implemented by means of hardware comprising several distinct elements, and by means of a suitably programmed computer. In the device claim enumerating several means, several of these means can be embodied by one and the same item of hardware.

What is claimed is:

1. A motion vector processing method, comprising:

generating (MV-EVAL, MV-MEM) a motion vector (MV) for a given picture part (I) based on a selection of a motion vector out of a predetermined set of motion vectors determined for picture parts spatio-temporally adjacent to said given picture part to obtain a selected motion vector;

furnishing (MV-EVAL) a selection indication (SI) of the selected motion vector; and supplying (EOC) said given picture part (I) and said selection indication (SI).

2. A motion vector processing device, comprising:

means (MV-EVAL, MV-MEM) for generating a motion vector (MV) for a given picture part (I) based on a selection of a motion vector out of a predetermined set of motion vectors determined for picture parts spatio-temporally adjacent to said given picture part to obtain a selected motion vector;

means (MV-EVAL) for furnishing a selection indication (SI) of the selected motion vector; and means (EOC) for supplying said given picture part (I) and said selection indication (SI).

3. An image signal decoder, comprising:

means (MP) for processing a selection indication (SI) indicating a selected motion vector selected for a given picture part (I) out of a predetermined set of motion vectors, determined for picture parts spatio-temporally adjacent to said given picture part to obtain motion data (MD); and means (V-DEC) for generating an output picture part (OPP) based on said given picture part (I) and said motion data (MD).

4. An image signal display apparatus, comprising:

an image signal decoder as claimed in claim 3;

an output processor (OP) coupled to receive said output picture part (OPP) to form a display signal; and a display device (D) for displaying said display signal.

* * * * *